US 12,478,758 B2

United States Patent
Goebel et al.

(10) Patent No.: US 12,478,758 B2
(45) Date of Patent: Nov. 25, 2025

(54) VENTILATOR AND METHOD FOR CONTROLLING A GAS SOURCE AND TWO ROTARY VALVES

(71) Applicant: Loewenstein Medical Technology S.A., Luxembourg (LU)

(72) Inventors: Christof Goebel, Hamburg (DE); Jan Schattner, Pinneberg (DE)

(73) Assignee: LOEWENSTEIN MEDICAL TECHNOLOGY S.A., Luxembourg (LU)

( * ) Notice: Subject to any disclaimer, the term of this patent is extended or adjusted under 35 U.S.C. 154(b) by 999 days.

(21) Appl. No.: 17/597,267

(22) PCT Filed: Jun. 23, 2020

(86) PCT No.: PCT/EP2020/025296
§ 371 (c)(1),
(2) Date: Dec. 30, 2021

(87) PCT Pub. No.: WO2021/008722
PCT Pub. Date: Jan. 21, 2021

(65) Prior Publication Data
US 2022/0313941 A1  Oct. 6, 2022

(30) Foreign Application Priority Data
Jul. 2, 2019 (DE) .......................... 102019004642.0

(51) Int. Cl.
*A61M 16/20* (2006.01)
*A61M 16/00* (2006.01)

(52) U.S. Cl.
CPC ...... *A61M 16/205* (2014.02); *A61M 16/0069* (2014.02); *A61M 16/204* (2014.02)

(58) Field of Classification Search
CPC .......... A61M 16/0006; A61M 16/0009; A61M 16/0069; A61M 16/0096; A61M 16/024;
(Continued)

(56) References Cited

U.S. PATENT DOCUMENTS 2,695,036 A * 11/1954 Kronheim ............. F16K 11/085
137/625.21
5,931,163 A * 8/1999 Stegmann ............. A61M 16/20
128/205.24
(Continued)

FOREIGN PATENT DOCUMENTS

GB          920618 A  *  3/1963
JP     H02131773 A      5/1990
(Continued)

OTHER PUBLICATIONS

JP-2798256-B2 description translation (Year: 1998).*

*Primary Examiner* — Timothy A Stanis
*Assistant Examiner* — Kira B Daher
(74) *Attorney, Agent, or Firm* — Abel Schillinger, LLP

(57) ABSTRACT

The invention relates to a ventilator comprising a gas source, at least one gas path and a patient conduit and at least two valves, each of the valves having at least indirectly a port for the surrounding air and each of the valves being at least temporarily connected to the gas source and/or the patient conduit so as to conduct gas.

9 Claims, 11 Drawing Sheets

(58) Field of Classification Search
CPC ...... A61M 16/1055; A61M 16/20–209; A61M 2205/3365; A61M 2205/3553; A61M 2205/3561; A61M 2205/3592; F16K 5/0414
USPC ........................................................ 251/310
See application file for complete search history.

(56)  References Cited

U.S. PATENT DOCUMENTS

| | | | |
|---|---|---|---|
| 8,342,204 B2* | 1/2013 | Dirker | F01L 7/10 123/80 BA |
| 2007/0056588 A1* | 3/2007 | Hayek | A61M 16/06 128/205.25 |
| 2012/0285460 A1* | 11/2012 | Smith | A61M 16/0069 128/205.24 |
| 2013/0133655 A1 | 5/2013 | Kimm et al. | |
| 2015/0027445 A1 | 1/2015 | Garde et al. | |
| 2015/0165144 A1 | 6/2015 | Lee et al. | |
| 2016/0018009 A1* | 1/2016 | Liu | F16K 5/12 251/207 |
| 2019/0298947 A1 | 10/2019 | Trivikram | |

FOREIGN PATENT DOCUMENTS

| | | |
|---|---|---|
| JP | 2798256 B2 * | 9/1998 |
| WO | 2011073839 A2 | 6/2011 |
| WO | 2013068918 A1 | 5/2013 |
| WO | 2013182944 A1 | 12/2013 |
| WO | 2017144963 A2 | 8/2017 |

* cited by examiner

VENTILATOR AND METHOD FOR CONTROLLING A GAS SOURCE AND TWO ROTARY VALVES

BACKGROUND OF THE INVENTION

1. Field of the Invention

The present invention relates to a ventilator and a method for controlling a gas source and two rotary valves.

2. Discussion of Background Information

Ventilators are used for the therapy of respiratory disorders. The ventilators can be used in non-invasive and invasive ventilation and in therapy of the airways, both in a clinical environment and in a non-clinical environment.

The object of the invention is to provide an improved ventilator and a corresponding method that can be used for the therapy of respiratory disorders in non-invasive and invasive ventilation and in therapy of the airways and in cough support, both in a clinical environment and in a non-clinical environment.

SUMMARY OF THE INVENTION

The invention relates to a ventilator with a gas source (for example a blower), at least one gas line and a patient line and at least two valves, each of the valves at least indirectly having a connection to the ambient air, and the valves being arranged in the gas line or as part of the gas line.

According to the invention, the gas line can comprise at least partial regions of a blower and/or at least of a valve or valve body.

It will be noted that the features set out individually in the claims can be combined with one another in any desired, technically meaningful way and show further refinements of the invention. The description additionally characterizes and specifies the invention in particular in conjunction with the figures.

It will also be noted that an "and/or" conjunction used herein between two features, and linking them to each other, is always to be interpreted as meaning that in a first embodiment of the subject matter according to the invention only the first feature may be present, in a second embodiment only the second feature may be present, and in a third embodiment both the first and the second feature may be present.

Within the meaning of the invention, the gas source can be a compressed gas line, a compressed gas source and/or a valve arrangement or an electrically operated blower.

In addition or alternatively, the invention relates to a ventilator in which the valves are at least temporarily connected to the gas source and the patient line or the ambient air in a gas-conducting manner.

Alternatively or in addition, the invention also relates to a ventilator in which the two valves are fluidically connected in series in at least one switching position and in at least one part of the gas line.

Alternatively or in addition, the invention also relates to a ventilator which is characterized in that one of the valves (switching valve) has a switching action which is such that insufflation of the patient is provided in a first switching position and exsufflation of the patient is provided in a second switching position.

In an advantageous embodiment of the invention, provision is made that one of the valves (oscillation valve) acts in such a way that the flow resistance in the gas line between gas source and patient can be varied by stepwise opening and closing of this valve, in such a way that oscillations of flow and pressure are brought about during the insufflation and/or the exsufflation.

In another advantageous embodiment of the invention, provision is made that at least one control unit is set up and designed to control the gas source and/or to control the switching valve and/or to control the oscillation valve.

The invention also provides that the control unit is set up and designed to control the blower and/or to control the switching valve and/or to control the oscillation valve, wherein for the insufflation by the blower a correspondingly high pressure is specified for a defined time and then switched to exsufflation by the switching valve and/or the blower, for which purpose the pressure is lowered to a correspondingly negative level within a defined time span and maintained for a certain duration, wherein the pressure is then increased again to the desired level for the insufflation, wherein the switchover is effected in particular by the switching valve and/or the blower.

In addition, the invention also provides that the control unit is set up and designed to control the blower and/or to control the switching valve and/or to control the oscillation valve, wherein for the insufflation by the blower a correspondingly high pressure is specified for a defined time and then switched to exsufflation by the switching valve and/or the blower, for which purpose the pressure is lowered to a correspondingly negative level within a defined time span and maintained for a certain duration, wherein the blower then increases the pressure again to the desired level for the pause, wherein the pressure during the pause has a slight overpressure, which is in particular between 2 and 15 mbar.

The invention also provides that the control unit is set up and designed to control the blower and/or to control the switching valve and/or to control the oscillation valve, wherein the drop in pressure at the transition from insufflation to exsufflation takes place by suitable switchover of the switching valve, such that a gas flow takes place from the patient line to the environment via the suction side of the blower.

The invention also provides that the control unit is set up and designed to control the blower and/or to control the switching valve and/or to control the oscillation valve, wherein the increase in pressure from the exsufflation to the next insufflation or after a pause to the following insufflation is preferably carried out less quickly or over a longer period of time, wherein the pressure increase is effected not only by changing the valve position of the switching valve but also by suitably ramping up the blower.

The invention also provides that the control unit is set up and designed to control the blower and/or to control the switching valve and/or to control the oscillation valve, wherein a defined oscillation takes place at the pressure level of inspiration or that of expiration or in the switchover phase between inspiration and expiration or during the pause, wherein the oscillation valve acts in such a way that, by stepwise opening and closing of this valve, the flow resistance in the gas line between blower and patient can be varied such that oscillations of flow and/or pressure are brought about.

The invention also provides that the control unit is set up and designed to control the blower and/or to control the switching valve and/or to control the oscillation valve, wherein for a cough maneuver the switching valve is brought to the valve position for the insufflation and then the speed of the blower is increased, as a result of which the pressure increases accordingly, wherein the speed is maintained after the pressure required for the insufflation has been reached, and, for the change to exsufflation, the switching valve is switched to the valve position for exsufflation, as a result of which the pressure drops accordingly over a short period of time, and thus the negative pressure necessary for exsufflation is reached, and the pressure and/or the speed of the blower for exsufflation is maintained for a predetermined time.

In a supplementary embodiment of the invention, provision is made that at least one of the valves is designed as a rotatably mounted valve (rotary valve).

In yet another advantageous embodiment of the invention, provision is made that at least one of the valves is designed as an axial valve, wherein an axial or linear motion guide for an opening or closing process is characteristic of an axial valve.

In a supplementary advantageous embodiment of the invention, provision is made that the switching valve has an electrically driven motor with a stator and a valve body fastened for conjoint rotation to the rotor, wherein the valve body is rotatably mounted about an axis of rotation, and a radial and an axial direction of the valve body are defined on the basis of the axis of rotation.

In a still further or supplementary advantageous embodiment of the invention, provision is made that the oscillation valve has an electrically driven motor with a stator and a valve body fastened for conjoint rotation to the rotor, wherein the valve body is rotatably mounted about an axis of rotation, and a radial and an axial direction of the valve body are defined on the basis of the axis of rotation.

In an alternative or supplementary advantageous embodiment of the invention, provision is made that the oscillation valve is designed as a rotatably mounted valve, and the valve body has at least one opening in the radial direction and at least one opening in the axial direction.

An opening within the meaning of the invention is a breakthrough or a recess in the valve, or a partial region that at least temporarily permits a gas flow. The opening can also arise between two structural parts that functionally interact in such a way that they at least temporarily open an opening for a gas flow.

According to the invention, an opening is formed when a gas flow through the opening or along the opening is possible at least temporarily.

In a further alternative or supplementary advantageous embodiment of the invention, provision is made that the opening points in the axial direction to the connection that leads to the ambient air.

In an advantageous embodiment of the invention, provision is made that the valve body has a central region which extends in a cylindrical shape in the axial direction around the receptacle for the motor shaft, and the valve body also has a cover disk, which extends from the upper end of the central region in the radial direction, and, on the radial outer edge or near the outer edge of the cover disk, a wall region which extends in the axial direction or at a right angle starting from the cover disk and extends substantially parallel to the central region, wherein a channel that conducts gas extends between the wall region and the central region, and the openings are connected via the channel in a gas-conducting manner.

According to another advantageous development, the cover disk has an opening which, in a rotary position of the valve, is connected to the connection to the environment in a gas-conducting manner.

According to a further advantageous development, the shape of the opening and/or the shape of the connection are designed such that the overlap between the opening and the connection, upon rotation of the valve, increases or decreases linearly depending on the direction of rotation.

In a further advantageous embodiment of the invention, provision is made that the blower, which has a suction side and a pressure side, with at least one control unit, wherein the pressure side is connected in a gas-conducting manner to a switching valve and is connected to an oscillation valve, wherein the suction side is connected to the switching valve and the oscillation valve, wherein the switching valve has a connection to the suction side and a connection to the pressure side and a connection to the ambient air, and wherein the oscillation valve has a connection to the patient line and a connection to the pressure side and a connection to the ambient air.

In another supplementary advantageous embodiment, the invention provides that the switching valve and the oscillation valve are arranged in series between the blower and the patient line, wherein the connection to the patient line of the switching valve leads to the connection to the pressure side of the oscillation valve, and the switching valve is to this extent indirectly connected to the patient line, and the oscillation valve is indirectly connected to the pressure side.

In another supplementary and advantageous embodiment, the invention provides that the control unit is set up and designed to control the blower and/or to control the switching valve and/or to control the oscillation valve.

In a further supplementary and advantageous embodiment, the invention provides that the switching valve and the oscillation valve have a common control unit or separate control units, wherein alternatively or in addition these control units communicate with the control unit that controls the blower. Provision is also made that only one control unit controls the blower, the switching valve and the oscillation valve. The blower, the switching valve and the oscillation valve can also each have a control unit, all of which are coordinated and controlled by a central control unit.

In a supplementary advantageous embodiment, the invention provides that the switching valve has switching means which are designed as a motor, as stops and as a valve body in a valve housing.

In another advantageous embodiment, the invention provides that the stops are formed in the valve housing.

In a further advantageous embodiment, the invention provides that the motor rotates the valve body between at least three switching states, wherein the maximum rotation between the stops is a maximum of 150°, preferably a maximum of 120°, particularly preferably a maximum of 100°.

In an advantageous embodiment, the invention provides that the switching states for the switching valve are inhalation, exhalation and pause, wherein for inhalation the position of the valve body enables a gas flow from the environment to the suction side of the blower and at the same time permits a gas flow from the pressure side to the connection of the second valve.

According to a further advantageous embodiment, the invention provides that the switching states for the switching valve are inhalation, exhalation and pause, wherein for exhalation the position of the valve body enables a gas flow from the connection of the second valve to the suction side of the blower via the connection and permits a gas flow from the pressure side to the environment.

According to a supplementary advantageous embodiment, the invention provides that the switching states for the switching valve are inhalation, exhalation and pause, wherein for the pause the position of the valve body enables a gas flow from the suction side of the blower to the pressure side, as a result of which the gas flow in at least one of the two directions from the environment to the patient or from the patient to the environment is substantially suppressed.

According to another advantageous embodiment, the invention provides that the oscillation valve is designed as a rotary valve and is equipped with a rotary valve body with motor and with openings in several planes in a valve housing.

According to yet another advantageous embodiment, the invention provides that the motor is a stepper motor.

According to a further advantageous embodiment, the invention provides that the stops are formed on the valve housing.

According to an alternative advantageous embodiment, the invention provides that the rotary valve body has openings which point in the radial direction and the axial direction.

According to a supplementary advantageous embodiment, the invention provides that the opening to the ambient air is arranged axially in the cover disk of the rotary valve body, and a rotation of the rotary valve body brings the opening into overlap with the connection to the ambient air.

According to a further advantageous embodiment, the invention provides that the openings are arranged radially in the rotary valve body and, in the corresponding switching position of the rotary valve body, permit a gas flow from the pressure side to the connection of the second valve via the connection of the switching valve and onward to the patient line via the connection.

According to yet another advantageous embodiment, the invention provides that, in a pause switching state, a rotation of the rotary valve body frees the opening with the opening to the environment and permits a gas flow or a pressure reduction into the environment, and the patient line is connected to the environment directly, bypassing the switching valve.

In a supplementary advantageous embodiment of the invention, provision is made that, in an oscillation switching state, an oscillating movement of the valve body of the oscillation valve takes place with a defined frequency, which opens the opening to the environment and closes it again, which causes a temporary, frequency-dependent gas flow or pressure reduction into the environment, as a result of which the gas flow in at least one of the directions toward or away from the patient is superposed with pressure and flow oscillations.

In an alternative advantageous embodiment of the invention, provision is made that the oscillating movement is a rotary movement of the rotatably mounted valve body of an oscillation valve.

In another advantageous embodiment of the invention, provision is made that the oscillating movement is an axial movement of an axially mounted valve body of an oscillation valve.

In another advantageous embodiment of the invention, provision is made that the stops are made hard.

Rotary angle sensors or light barriers can additionally be used to detect the position of the valves.

As regards the definitions of ventilator-related terms and the effects and advantages of features pertaining to ventilators, reference is made in full to the explanations of analogous definitions, effects and advantages throughout the text. Disclosures herein relating to the ventilator according to the invention should also be able to be used in an analogous manner to define the method according to the invention, unless this is expressly excluded herein. In this respect, repetition of explanations corresponding to the same features throughout the text, their effects and advantages, with regard to the method according to the invention disclosed herein and with regard to the ventilator according to the invention disclosed herein, is largely dispensed with in favor of a more concise description.

The invention affords the following advantages, among others:

The opening in the oscillation valve permits rapid relief of the patient, who does not have to breathe through the blower.

Greater pressure amplitudes are possible through an opening to the environment with which the oscillation valve communicates, since air can escape from the system and the pressure can be reduced effectively and quickly.

The oscillation valve has to rotate a maximum of 90° in order to permit the oscillation; the movements for the motor are small.

Asymmetrical patterns of the pressure or flow oscillation can be quickly generated by moving the oscillation valve to and fro.

The division of the two functions into switching the direction of flow and generating oscillation on the flow is made more favorable by separate valves. Individual valves are easier and quicker to manufacture, and their respective function is easier to implement and optimize at a technical level.

For example, individual valves can be manufactured with a lower mass inertia than valves that are intended to fulfill both functions in one; these would typically have to be made larger. This results in dynamic advantages during the switching processes and/or oscillations. Tolerance considerations are less critical because the valve bodies are less complex.

Leaktightness is easier to produce because there are fewer possible switching positions for each valve.

Among other things, with small possible tolerances, it is considered possible to dispense with additional components such as flexible seals.

A clear assignment of the different functions switching for cough maneuvers and oscillation during the different phases of a cough maneuver—can be made to the two valves.

The control of the valves can be developed and optimized separately and does not have to take place for a valve with a more complex overall function.

According to the invention, linear drives are contemplated as a type of drive for the valves, wherein stepper motors for valves operated in rotation, for example as inexpensive mass-produced goods, bring with them cost advantages.

Moving onto stops with the valves allows the valve position to be recognized without additional sensors. This can be done, for example, during certain calibration maneuvers at the end of service processes or after every device start-up.

Depending on the choice of the opening of the oscillation valve, there is the possibility of superposing oscillations of flow and pressure with smaller or larger amplitudes on the flow toward or away from the patient.

The oscillation can be set precisely depending on the shape of the opening. The user can set oscillations with different amplitudes, which are realized by different rotation angle ranges of the oscillation valve during the oscillation.

The oscillation can be used in devices for mechanical ventilation and in devices for cough assistance. According to the invention, all of these devices and also further devices for respiratory therapy or ventilation are referred to as ventilators for the sake of simplicity.

In an advantageous embodiment of the invention, provision is made that the ventilator has at least one data transmission interface which is designed and set up to transmit the content of the frequency counter, stored in the memory unit and concerning coughing events, to a data receiver or a data-receiving unit. The data transmission can be wired or wireless. Data transmission interfaces can be, for example, an electronic data transmission bus, a network interface (e.g. LAN), a data transmission modem, a USB interface, a radio transmission interface, e.g. infrared, Bluetooth, WIFI, GSM/LTE and the like, or a removable storage medium, e.g. a memory card (flash), a USB stick/hard drive and the like. The data receiver or the data-receiving unit can be, for example, an external (remote) data processing device with an evaluation unit (e.g. evaluation software), an expert user (e.g. physician), a display device (e.g. display, monitor) and the like. The data-receiving unit can thus enable the analysis result to be found at a later time, in particular in cases where the ventilator does not have an internal evaluation unit. However, the ventilator can alternatively or additionally have an internal evaluation unit.

According to a further advantageous embodiment of the invention, the ventilator has a further sensor unit which is designed to detect a speed of a ventilation blower and/or a leakage loss of the respiratory gas during ventilation of the person and/or a type of respiration such as spontaneous breathing or mandatory breathing, and to supply these to the breath analyzer.

According to another advantageous development, the ventilator has an evaluation unit which is designed and set up to evaluate the analysis result of the analyzer with regard to cough-like complication states of the ventilated person and to store the result in the storage unit and/or to display it on a display device and/or to transmit it to an external data-receiving unit. For this purpose, the data transmission can in particular take place via the aforementioned data transmission interface. A data-receiving unit is to be understood in particular as a monitoring unit, a monitor in a hospital or care home, and, in the case of ventilation at home, a telemonitoring server. If the frequency and/or the severity of an established complication exceeds a specified limit value, the ventilator can likewise be designed to output an alarm, for example on the display device, and/or to send an alarm to the data-receiving unit.

It should be noted that, as regards the definitions of method-related terms and the effects and advantages of features pertaining to methods, reference is made in full to the above explanations of analogous definitions, effects and advantages relating to the device(s) according to the invention. Accordingly, disclosures herein relating to the device(s) according to the invention can also be used analogously to define the method according to the invention, and disclosures herein relating to the method according to the invention can be used analogously to define the device(s) according to the invention. A repetition of explanations relating to the same features, their effects and advantages is thus largely dispensed with.

BRIEF DESCRIPTION OF THE DRAWINGS

Further features and advantages of the invention will become clear from the following description of non-limiting illustrative embodiments of the invention, which are explained in more detail below with reference to the drawings.

The terms inhalation, insufflation and inspiration are used as synonyms in this application, as are the corresponding terms exhalation, exsufflation and expiration.

DETAILED DESCRIPTION OF EXEMPLARY EMBODIMENTS OF THE INVENTION

Figure 1:
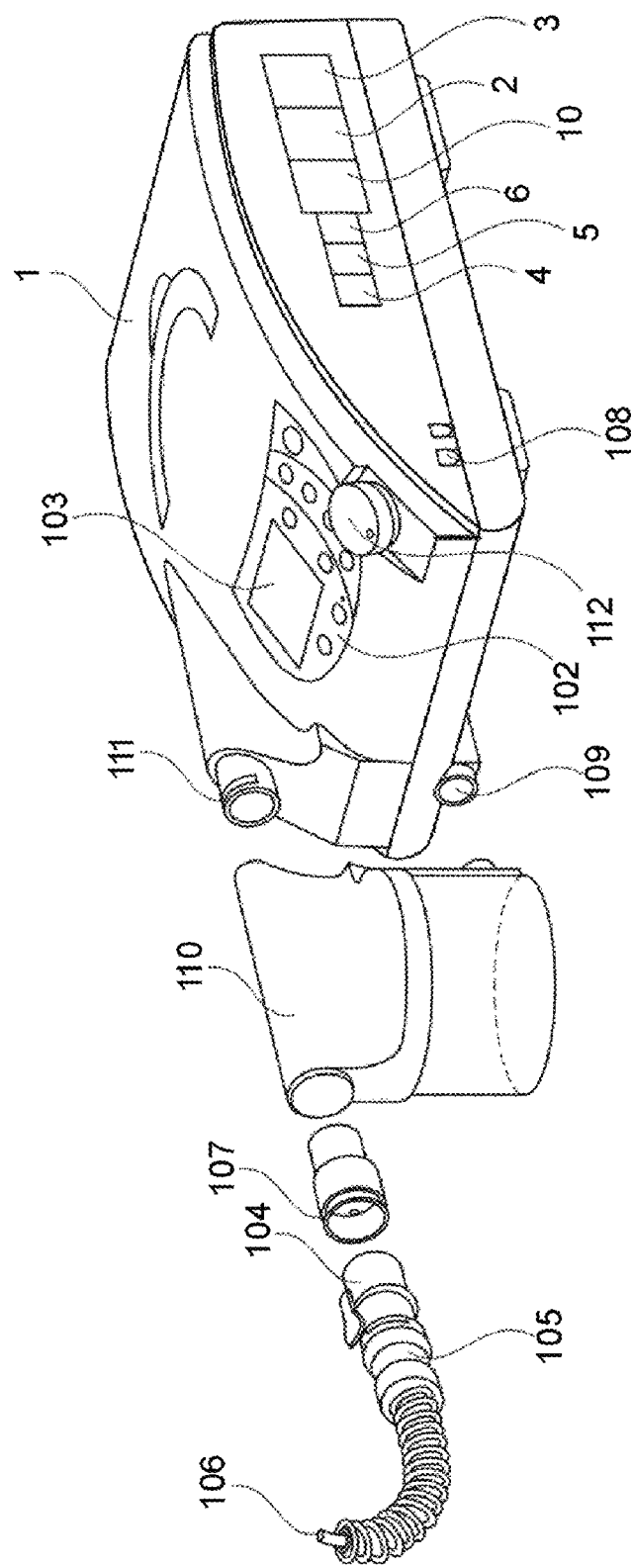
FIG. 1 shows a ventilator according to the invention.

FIG. 1 shows a ventilator 1 according to the invention. The ventilator 1 can be designed as a ventilator for home or clinical applications and/or as a cough therapy device and/or as a combined ventilator and cough therapy device.

The ventilator 1 is equipped with a blower device 10 or a fan, in order to generate a respiratory air flow for ventilating the patient. The ventilator 1 can in addition comprise at least one valve 2, 3. The ventilator 1 comprises, for example, at least one blower 10 and additionally at least one valve 2, 3, with which a respiratory air flow for inhalation and a respiratory air flow for exhalation are generated or modulated.

Alternatively, the ventilator 1 comprises, for example, two blowers and at least one valve, with which a respiratory air flow for inhalation and a respiratory air flow for exhalation are generated or modulated. The blower and/or the valve are optionally also designed and set up to superpose a respiratory air flow for inhalation and a respiratory air flow for exhalation with a defined oscillation.

The blower and/or the valve are optionally also designed and set up to generate or at least support the respiratory air flow for exhalation by means of a negative pressure. In this context, negative pressure means that the pressure generated by the ventilator is below the atmospheric pressure level.

A breathing hose system 104-107 can be attached via a connection device 111, 109. The connection device is part of the patient line 14. In addition, the ventilator here comprises, for example, a nebulizer device 110, in order to nebulize medicaments for example in the respiratory air, or a humidifier 110.

The ventilator is also used for the targeted support of discharge of secretions from a patient's airways and comprises at least one blower 10 and one valve 2, 3.

The hose system comprises a patient interface, which can be a mask or a mouthpiece, for example. In addition, a patient filter or bacterial filter is optionally used, which protects the hose system and/or ventilator from contamination with germs during the coughing or rebreathing phases. In addition, the hose system can optionally be equipped with an exhalation system or a switchable patient valve, the simplest embodiment having no further accessory in the hose system besides the patient interface and optional filter. For example, CO2-rich exhalation air can be discharged continuously or in a switching manner via an exhalation system or patient valve. However, the discharge of exhalation air can also be specifically adapted to breathing phases or coughing phases. Exhalation air can also be diverted to the ambient air via the at least one valve via at least one connection 26, 36.

The ventilator 1 also has a display device 103 and an operating device 102, 112 for inputs and settings. The operating device 102 can be designed as a touchscreen and/or as a mechanical operating element 112.

One or more control devices 4 are provided for controlling at least the blower and valve. The blower and valve or displays can also have their own or separate control devices. Specifications for the control of the blower and valve are preferably stored in the control device. These specifications can be at least partially adapted in particular by the user or a care provider. The control device 4 comprises, for example, at least one controller and/or other control components.

The ventilator 1 has at least one interface 108. For example, several ventilators can communicate wirelessly or by wire via the interface, or a ventilator can communicate wirelessly or by wire with a patient monitor or a hospital information system via the interface. The interface 108 is operatively connected to the control device 4, for example.

In an advantageous embodiment of the invention, the ventilator has at least one interface which is designed and set up to transmit the content of the frequency counter, stored in the memory unit and concerning coughing events, to a data receiver or a data-receiving unit. The data transmission can be wired or wireless here. Data transmission interfaces can be, for example, an electronic data transmission bus, a network interface (e.g. LAN), a data transmission modem, a USB interface, a radio transmission interface, e.g. infrared, Bluetooth, WIFI, GSM/LTE and the like, or a removable storage medium, e.g. a memory card (flash), a USB stick/hard drive and the like. The data receiver or the data-receiving unit can be, for example, an external (remote) data processing device with an evaluation unit (e.g. evaluation software), an expert user (e.g. physician), a display device (e.g. display, monitor) and the like. The data-receiving unit can thus enable the analysis result to be found at a later time, in particular in cases where the ventilator does not have an internal evaluation unit. However, the ventilator can alternatively or additionally have an internal evaluation unit.

The ventilator 1 here alternatively offers the option of coupling one or more external device components (humidifier, nebulizer, oxygen mixer, etc.) via the interface 108 and thus functionally expanding or replacing the ventilator 1.

Figure 2:
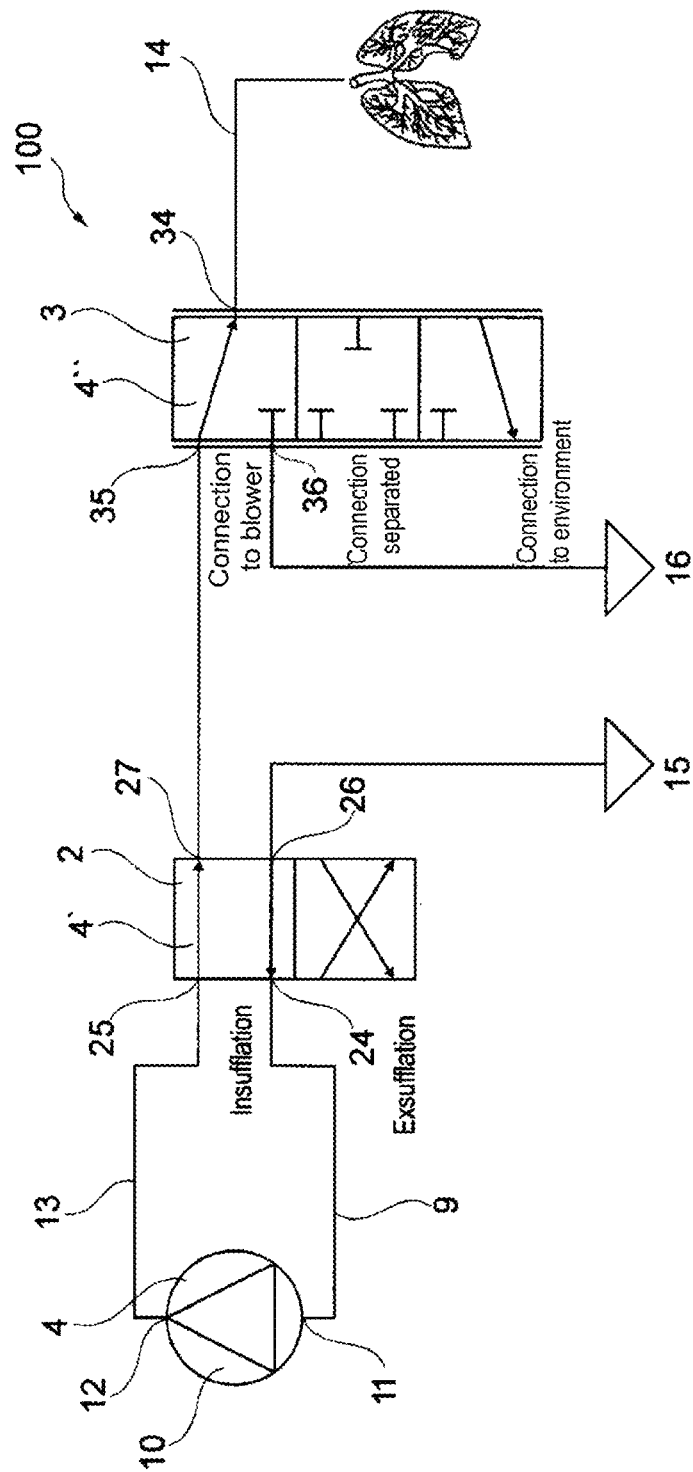
FIG. 2 shows a detailed schematic representation of the ventilator according to the invention.

FIG. 2 shows: The ventilator 100 according to the invention has at least one blower 10, with a suction side 11 and a pressure side 12, and at least one control unit 4, and a gas line 13 which connects the pressure side 12 to a patient line 14 in a gas-conducting manner. The gas line 13 is connected to a switching valve 2 and an oscillation valve 3. A suction gas line 9 connects the suction side 11 of the blower to the switching valve 2.

The switching valve 2 has a connection 24 to the suction side 11 and a connection 25 to the pressure side 12, a connection 26 to the ambient air 15, and a connection 27 to the patient line 14. The oscillation valve 3 has a connection 34 to the patient line 14, a connection 35 to the switching valve 2, and a connection 36 to the ambient air 16.

The switching valve 2 and the oscillation valve 3 are arranged in series between the blower 10 and the patient line 14. For example, both valves are arranged in a common valve block. The connection 27 of the switching valve 2 is connected to the connection 35 of the oscillation valve 3 via the gas line 13, and the connection 34 is connected to the patient line 14. To this extent, the blower is indirectly connected to the patient line 14 via the switching valve 2 and the oscillation valve 3. The ventilator is set up and designed to produce an at least temporary gas flow between the environment 15 and the patient line 14, the gas flow being able to take place at least in some sections in both directions.

The at least one control unit 4 is set up and designed to control the blower 10 and/or to control the switching valve 2 and/or to control the oscillation valve 3.

The at least one control unit 4 can be arranged adjacent to the valves and the blower 10 or remote from them and connected to them via a data line. The at least one control unit 4 controls the switching states for the switching valve 2 and the oscillation valve 3, namely inhalation, exhalation and pause.

Figure 3:
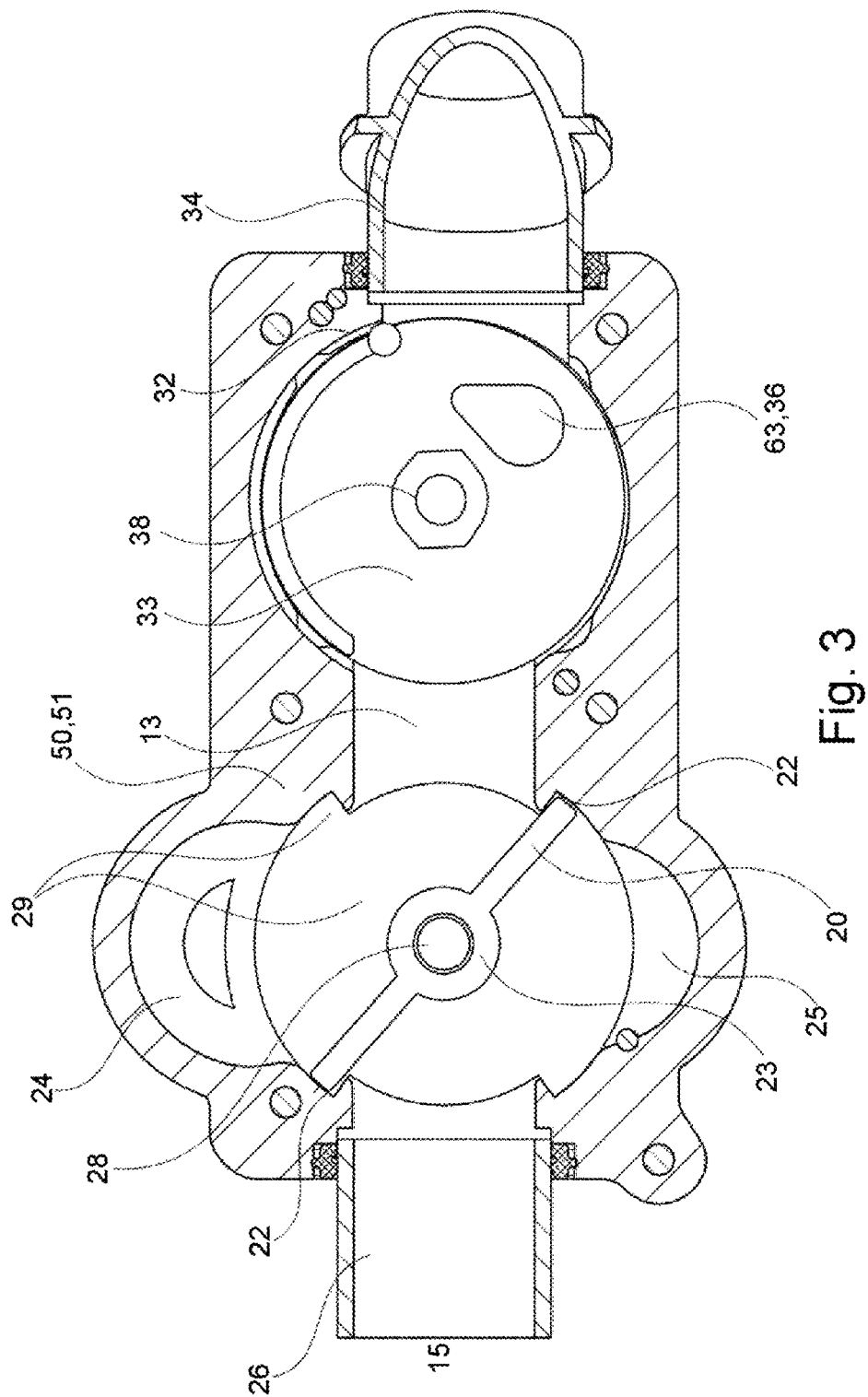
FIG. 3 shows the ventilator of the invention in a first stage of operation.

FIG. 3 shows: The switching valve 2 and the oscillation valve 3 are arranged in series in the valve block 50, shown here in the upper half, between the environment 15 and the patient line 14. The gas line 13 connects the switching valve 2 and the oscillation valve 3 and is implemented in the valve block. The switching valve 2 has a connection 24 to the suction side 11 and a connection 25 to the pressure side 12 of the blower. Another connection leads to the ambient air 15, and a connection 27 via the gas line 13 to the oscillation valve 3 and to the patient line 14. The switching valve 2 is arranged in the valve housing 29, which here is a partial region of the valve block 50, and is connected via the valve body 23 to the motor shaft 28. The switching valve 2 has an electrically driven motor with a stator and a valve body 23 fastened for conjoint rotation to the rotor. The motor has at least one winding through which current flows during operation.

The valve body 23 is mounted rotatably about an axis of rotation. A radial direction and an axial direction of the valve body 23 are defined on the basis of the axis of rotation.

Two switching means point radially outward from the valve body 23. The two switching means are designed as symmetrical valve surfaces 20. The valve housing 29 has a movement space for the switching means 20 and at least one stop 22 for the switching means. The stop is designed so that it limits the movement of the valve such that the switching means strike against the stop. The rotation is preferably limited to a range of 90-180° by two stops. Switching between inhalation and exhalation takes place using two switching states. A middle position is provided for the pause switching state.

Figure 4:
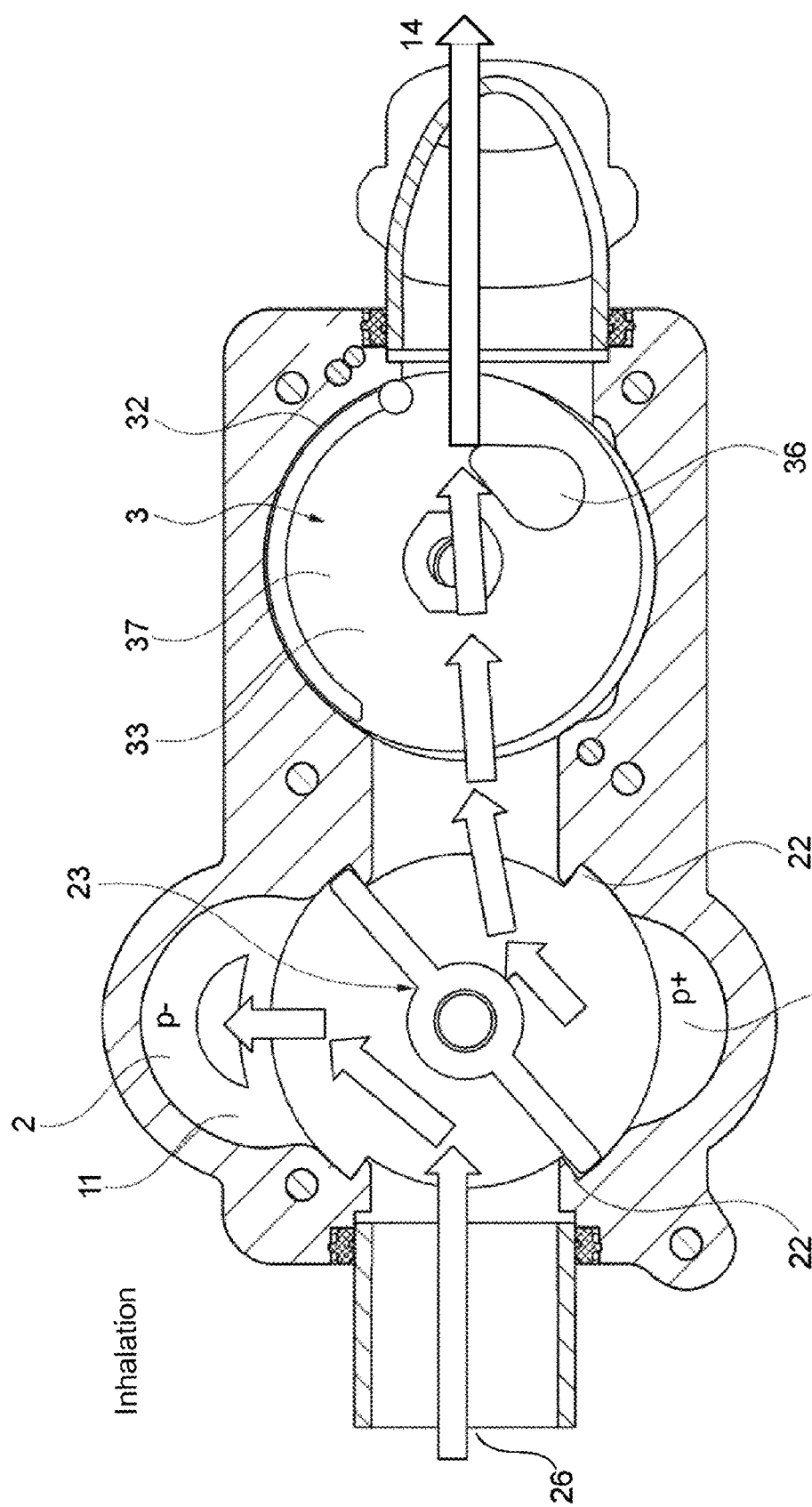
FIG. 4 shows the ventilator of the invention in a second stage of operation.

FIG. 4 in conjunction with FIGS. 2 and 3 shows: The switching valve 2 and the oscillation valve 3 are arranged in series in the valve block 50 between the environment 15 and the patient line 14. The gas line connects the switching valve 2 and the oscillation valve 3 and is implemented in the valve block. The switching valve 2 is arranged in the valve housing, which is here a partial region of the valve block, and is connected to the motor shaft via the valve body 23. The switching valve 2 has an electrically driven motor with a stator and a valve body 23 fastened for conjoint rotation to the rotor. The motor has at least one winding through which current flows during operation. The valve body 23 is mounted rotatably about an axis of rotation. A radial direction and an axial direction of the valve body 23 are defined on the basis of the axis of rotation 60.

Two switching means point radially outward from the valve body 23. The two switching means are designed as valve surfaces. The valve housing has a movement space for the switching means 20 and at least one stop 22 for the switching means. The stop is designed so that it limits the movement of the valve, such that the switching means strike against the stop. The rotation is preferably limited to a range of 90-180° by two stops 22. Switching between inhalation and exhalation takes place using two switching states. A middle position is provided for the pause switching state.

The oscillation valve is preferably designed as a rotatably mounted valve and is arranged in the valve housing 39, which is here a partial region of the valve block 50, and is connected to the motor shaft via the valve body 33. The oscillation valve 3 has a connection to the patient line 14, a connection to the switching valve 2, and a connection 36 to the ambient air. In this embodiment, the switching means is a rotary valve body 33 with openings in two different planes and directions. The openings point both radially and axially. At least one stop 32 on the valve and or the housing limits the rotation of the valve. A rotation of more than one full turn is thus prevented.

The oscillation valve 3 has an electrically driven motor with a stator and a valve body 33 fastened for conjoint rotation to the rotor. The motor has at least one winding through which current flows during operation. The valve body 33 is mounted rotatably about an axis of rotation. A radial direction and an axial direction of the valve body 33 are defined on the basis of the axis of rotation. The oscillation valve and/or the valve body 33 has at least one opening which leads to the patient line and an opening which leads to the ambient air. The valve body 33 is designed such that, depending on the valve position, it at least partially closes or opens the opening to the patient line or the opening to the ambient air for a respiratory gas flow.

The opening in the axial direction points to the connection 36 which leads to the ambient air 16. The valve body 33 has a central region which extends in the axial direction in a cylindrical shape around the receptacle for the motor shaft. The valve body 33 also has a cover disk 37 which, starting from the upper end of the central region, extends in the radial direction 61.

The cover disk 37 is not formed continuously and leaves at least one opening free, which opening extends in the axial direction.

The shape of the opening 63 or the shape of the connection 36 is for example chosen such that, upon rotation of the valve, the overlap between the opening and the connection 36 increases or decreases linearly depending on the direction of rotation. The overlap between the opening 63 and the connection 36 can also increase non-linearly upon rotation of the valve, for example quadratically or logarithmically or discontinuously.

The shape of the opening 63 and/or the shape of the connection 36 is, for example, at least partially oval, rounded or triangular.

For inhalation, the control unit 4 specifies the position of the switching valve 2 and of the oscillation valve 3 such that a gas flow from the environment via the connections 26 and 24 to the suction side 11 of the blower is possible and, at the same time, a gas flow from the pressure side 12 via the connection 25 and 27 to the connection 35 of the oscillation valve 3 and through the connection 34 to the patient line 14. The switching valve 2 and the oscillation valve 3 are arranged in series in the valve block between the blower 10 and the patient line 14.

Figure 5:
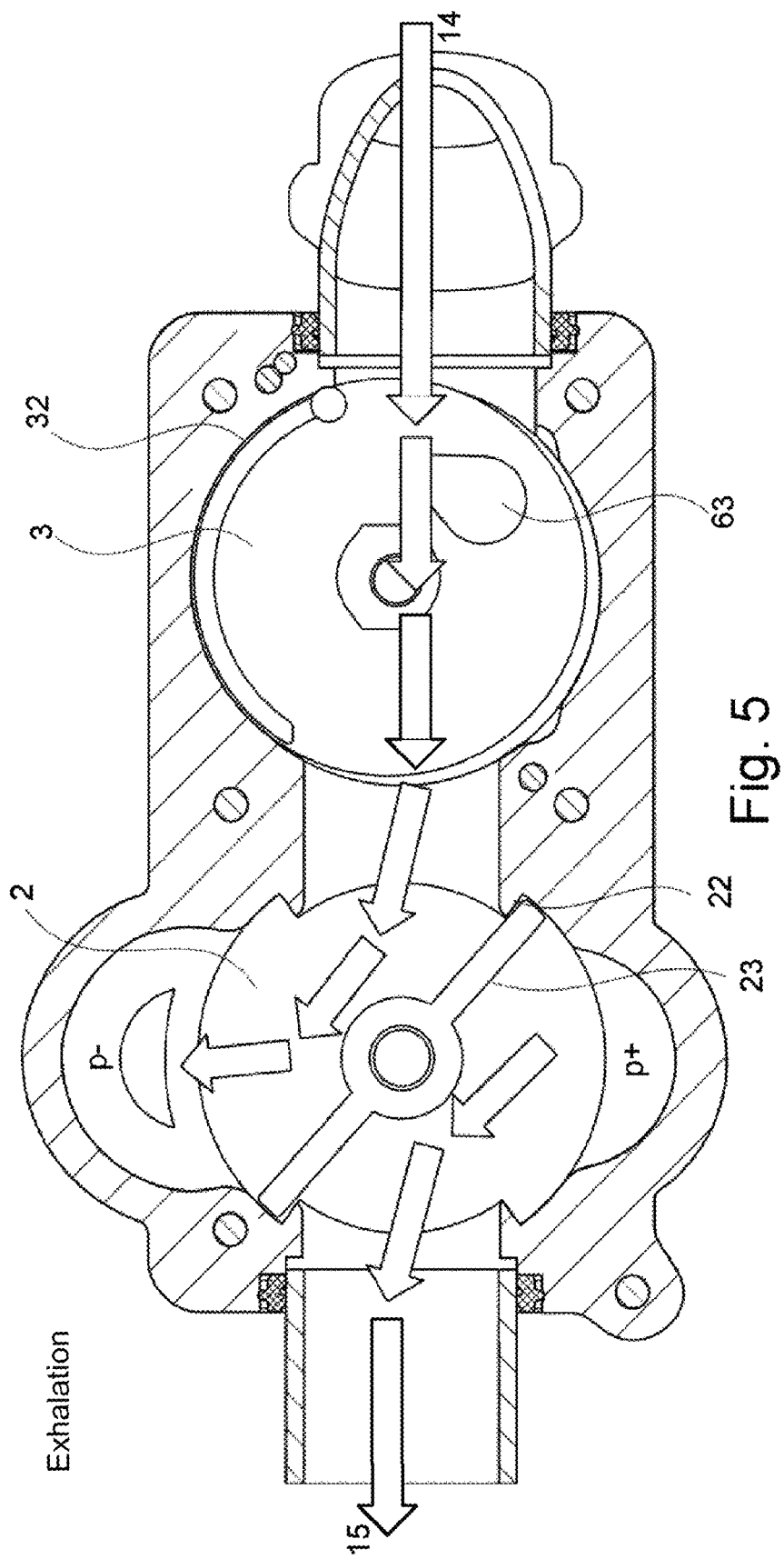
FIG. 5 shows the ventilator of the invention in a third stage of operation.

FIG. 5 in conjunction with FIGS. 2 and 3 shows: For exhalation, the control unit 4 specifies the position of the switching valve 2 and of the oscillation valve 3 such that a gas flow is enabled from the patient line 14 via the connection 34 and the connection 35 of the oscillation valve 3 and via the connection 27 and the connection 24 of the switching valve to the suction side 11 (P−) of the blower. The blower thus sucks in respiratory gas from the patient line. The respiratory gas flows through the valves 3 and 2 and the connection 26 and then exits to the ambient air 15. The valve body with its switching means separates the negative pressure region (P−) of the sucked in gases (arrows), which flow from the patient line 14 through the valve 3 and pass through a part of the switching valve 2 to the suction side of the blower, from the positive pressure region (P+) of the gases that are accelerated by the blower and are guided through a part of the switching valve 2 to the connection 26 and further to the ambient air 15, and leads a gas flow from the pressure side 12 to the connection 26 and further to the ambient air 15. In comparison with the position of the switching valve 2 from FIG. 4, it can be seen that for the exhalation the switching valve was moved such that the switching means pointing radially outward from the valve body 23 strike against two other stops 22 than in the inhalation position.

Figure 6:
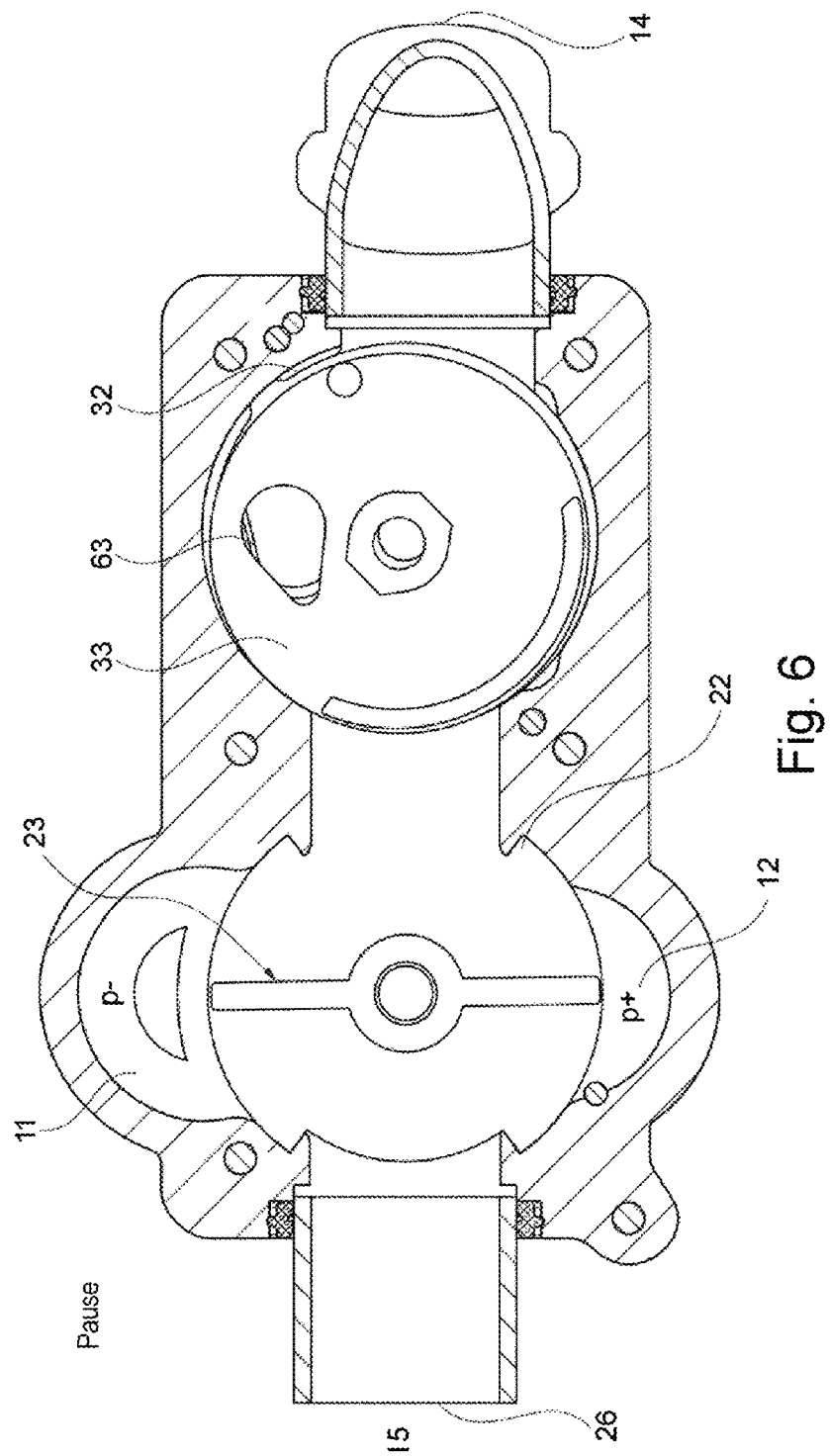
FIG. 6 shows the ventilator of the invention in a fourth stage of operation.

FIG. 6 in conjunction with FIGS. 2 and 3 shows: In comparison with the position of the switching valve 2 from FIG. 4 or FIG. 5, it can be seen that for the pause the switching valve was moved such that switching means protruding radially outward from the valve body 23 do not strike against any of the stops 22. Rather, the switching means are located in a position between two stops 22. Through this position of the switching means, a gas flow from the suction side 11 of the blower 10 to the pressure side 12 is free.

For the pause, the control unit 4 specifies the position of the switching valve 2 and of the oscillation valve 3 such that a gas flow through the connection 25 to the connection 24 is free and therefore a gas flow from the suction side 11 of the blower 10 to the pressure side 12 is free and a gas flow to the environment is at least partially suppressed or is not actively conveyed by the blower. Since a recirculation from the pressure side of the blower toward the suction side of the blower takes place in this switching position, no gas flow is enforced toward the oscillation valve or toward the patient or away from the oscillation valve or away from the patient. Rather, the switching valve is preferably designed in such a way that, in the pause switching position, it has a neutral effect with respect to the patient's respiration, and inhalation or exhalation on the part of the patient is in principle possible through the switching valve.

The oscillation valve 3 was switched such that a gas flow from or to the switching valve is not possible. A free respiration of the patient through the oscillation valve to the environment is preferably possible, since the valve was moved such that the opening 63 is connected to the connection 36 to the ambient air in a gas-conducting manner and thus a gas flow between the patient and the environment is possible.

Figure 7:
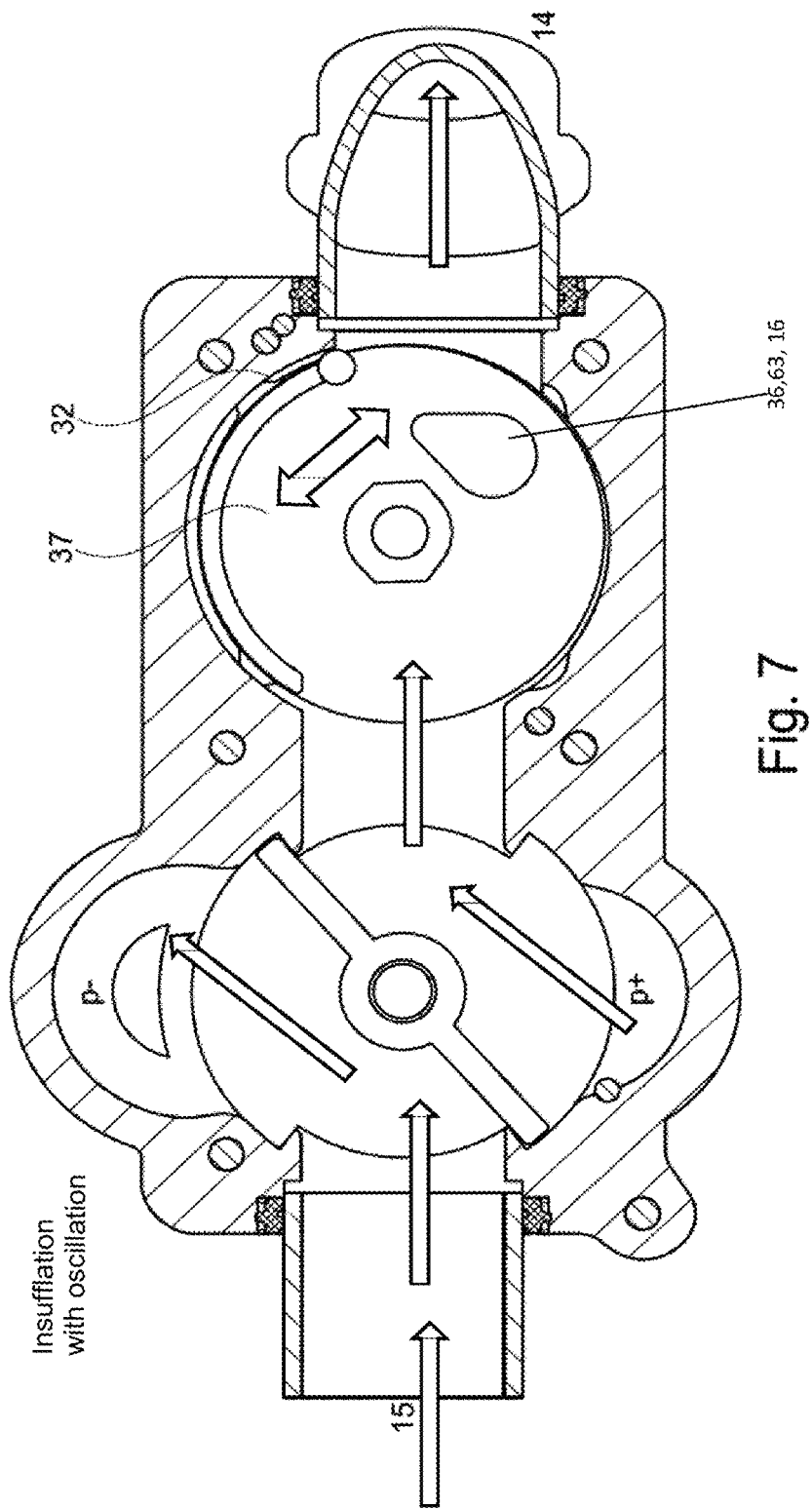
FIG. 7 shows the ventilator of the invention in a fifth stage of operation.

FIG. 7 in connection with FIGS. 2-5 shows: For inhalation with oscillation, the control unit 4 specifies the position of the switching valve 2 and of the oscillation valve 3 such that a gas flow (arrows) from the environment 15 via the connections 26 and 24 to suction side 11 of the blower is possible, and at the same time a gas flow from the pressure side 12 via the connections 25 and 27 to the connection 35 of the oscillation valve 3 and through the connection 34 to the patient line 14. Moreover, the control unit 4 specifies the position of the oscillation valve 3 such that the connection 36 is alternately connected to the environment and again not connected (indicated by the double arrow). Depending on the frequency with which the position of the oscillation valve 3 specifies in this way, there are flow and pressure fluctuations (oscillations) which superpose the respiratory air flow to the patient. The alternating connection to the ambient air results in a pulsating pressure reduction, which corresponds to the frequency of the movement of the oscillation valve 3.

Figure 8:
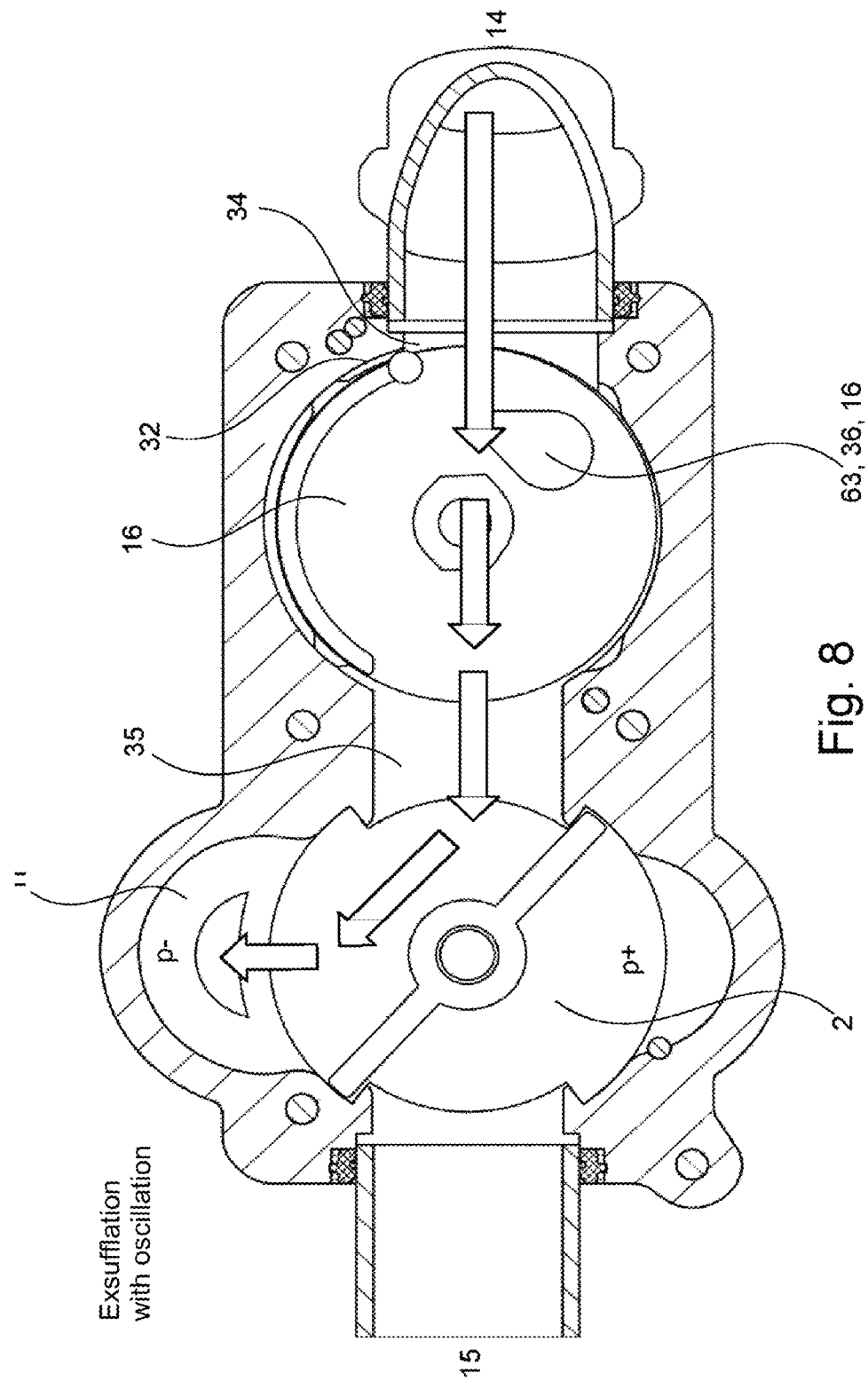
FIG. 8 shows the ventilator of the invention in a sixth stage of operation.

FIG. 8 shows in conjunction with FIGS. 2-5 and 7: For exhalation with oscillation, the control unit 4 specifies the position of the switching valve 2 and of the oscillation valve 3 such that a gas flow from the patient line 14 via the connection 34 and the connection 35 of the rotary valve 3 and via the connection 27 and the connection 24 of the switching valve to the suction side 11 of the blower (P−) is possible, and a gas flow from the pressure side 12 (P+) to the environment 15. Moreover, the control unit 4 specifies the position of the oscillation valve 3 such that the connection 36 is alternately connected to the environment and again not connected. Depending on the frequency with which the position of the oscillation valve 3 in this way specifies, there are flow and pressure fluctuations that superpose the respiratory air flow of the patient's exhalation. The alternating connection to the ambient air results in a pulsating pressure reduction which corresponds to the frequency of the movement of the oscillation valve 3.

Figure 9:
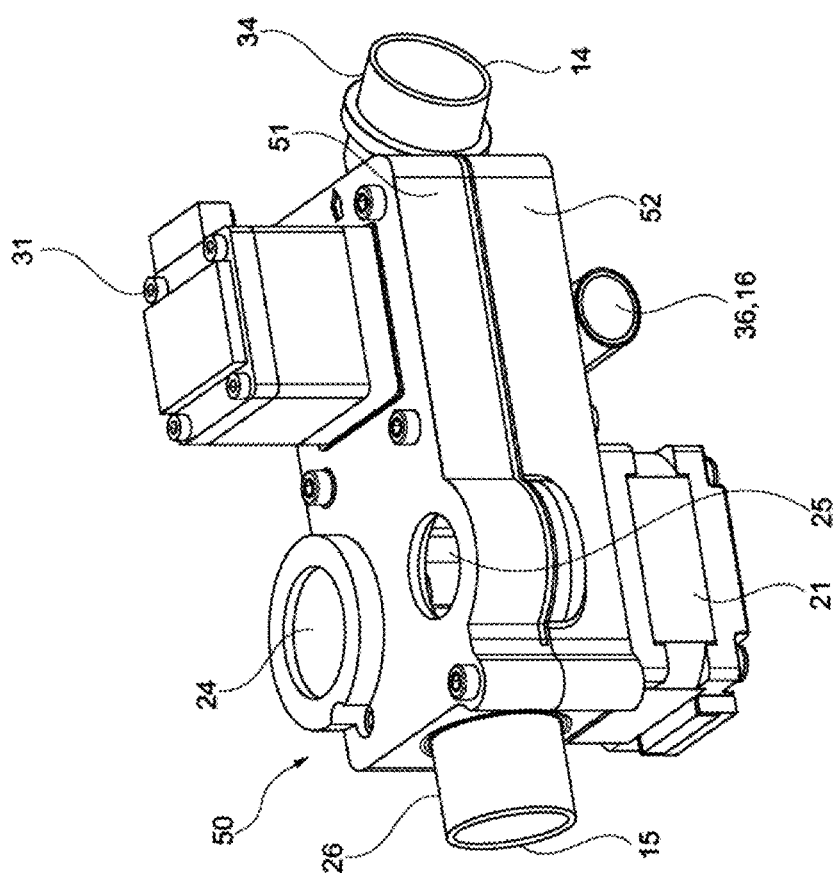
FIG. 9 shows an example of valve of the ventilator of the invention.

FIG. 9 shows in conjunction with FIGS. 2-8: The valve 2, 3 according to the invention is constructed here as a common valve block 50. The gas line 13 (not shown here), which connects the pressure side 12 of the blower in a gas-conducting manner to a patient line 14, is implemented in the valve block. The gas line 13 is connected to a switching valve 2 and to an oscillation valve 3. The switching valve 2 has a connection 24 to the suction side 11 and a connection 25 to the pressure side 12 of the blower (not shown), a connection 26 to the ambient air 15, and a connection 27 to the patient line 14. The oscillation valve 3 has a connection 34 to the patient line 14, a connection 35 to the switching valve 2, and a connection 36 to the ambient air 16.

The switching valve 2 and the oscillation valve 3 are arranged in series in the valve block between the blower 10 and the patient line 14. The connection 27 of the switching valve 2 is connected to the connection 35 of the oscillation valve 3 via the gas line 13, and the connection 34 is connected to the patient line 14. To this extent, the blower is indirectly connected to the patient line 14 via the switching valve 2 and the oscillation valve 3. The valve block 50 has an upper half 51 and a lower half 52. The motor 31 of the oscillation valve is arranged in the region of the upper half 51. The motor 21 of the switching valve is arranged in the region of the lower half 52. The motors can also be arranged on one side or one half 51, 52.

Upper half 51 and lower half 52 can be screwed or latched or glued together. The realization of the valve bodies of both valves in one valve housing has, in turn, advantages as regards manufacturing costs and installation space.

Figure 10:
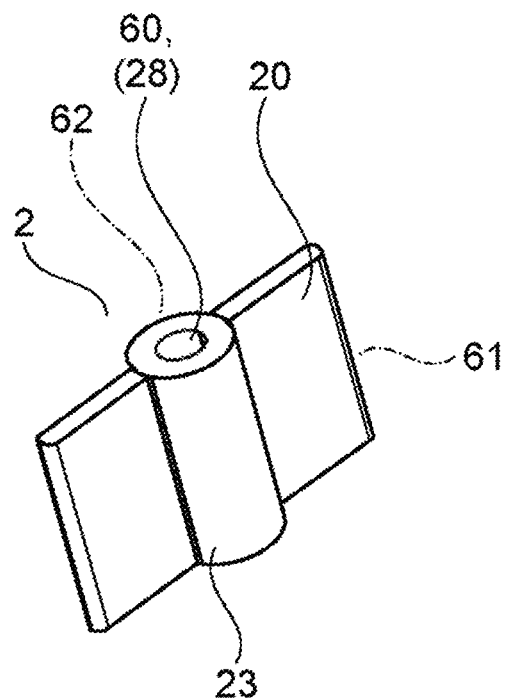
FIG. 10 shows a valve body mounted rotatably about an axis of rotation.

FIG. 10 shows: The valve body 23 is mounted rotatably about an axis of rotation 60. A radial and an axial direction 61, 62 of the valve body 23 are defined on the basis of the axis of rotation 60. Two switching means 20 point radially outward from the valve body 23. The two switching means 20 are designed as symmetrical valve surfaces 20. The valve housing 29 has a movement space for the switching means 20 and at least one stop 22 for the switching means. The stop is designed such that it limits the movement of the valve so that the switching means strike against the stop. The rotation is preferably limited to a range of 90-180° by two stops. Switching between inhalation and exhalation takes place using two switching states. A middle position is provided for the pause switching state.

Figure 11:
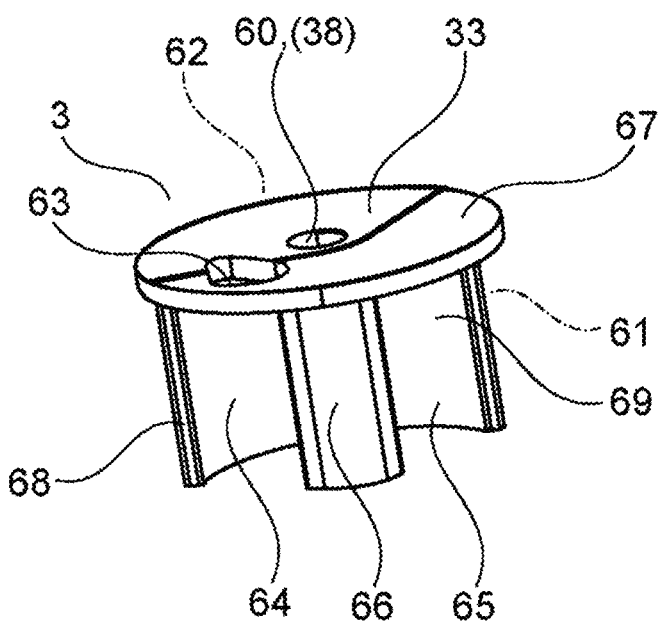
FIG. 11 shows an oscillation valve designed as a rotatably mounted valve arranged in a valve housing which is a partial region of a valve block.

FIG. 11 shows: The oscillation valve is preferably designed as a rotatably mounted valve and is arranged in the valve housing 39, which here is a part region of the valve block 50, and is connected to the motor shaft 38 via the valve body 33. The oscillation valve 3 has a connection 34 to the patient line 14, a connection 35 to the switching valve 2, and a connection 36 to the ambient air 16. In this embodiment, the switching means is a rotary valve body 33 with openings 63, 64, 65 in two different planes and directions. The openings point both radially and axially. At least one stop 32 on the valve and/or on the housing limits the rotation of the valve. This prevents a rotation by more than one full turn.

The oscillation valve has an electrically driven motor 21 with a stator and with a valve body 33 fastened for conjoint rotation to the rotor. The motor has at least one winding through which current flows during operation.

The valve body 33 is mounted rotatably about an axis of rotation 60. A radial and an axial direction 61, 62 of the valve body 33 are defined on the basis of the axis of rotation 60.

The oscillation valve and/or the valve body 33 has at least one opening which leads to the patient line, an opening 63 which leads to the ambient air, and the valve body 33 is designed such that, depending on the valve position, it at least partially closes or opens the opening which leads to the patient line, or the opening 63 which leads to the ambient air, for a respiratory gas flow.

The oscillation valve and/or the valve body 33 has at least one opening which leads to the patient line, and a further opening which leads to the ambient air, wherein the valve body 33 is designed such that, depending on the valve position, it at least partially closes or opens the opening which leads to the patient line, or the opening which leads to the ambient air, for a respiratory gas flow.

The valve body 33 of the oscillation valve has a region 66 which represents the receptacle 38 for the motor shaft, and also a wall region 68 which, in a rotary position of the valve, at least partially closes or opens the opening which leads to the patient line, or the opening which leads to the ambient air, for a respiratory gas flow, and, according to the rotary position of the valve, at least one opening 63, 64, 65 of the valve thus enables a respiratory gas flow in the direction of the patient line or a gas flow in the direction of the environment 16.

The opening 63 in the axial direction 62 points to the connection 36 that leads to the ambient air 16. The oscillation valve and/or the valve body 33 has at least one opening 65, 64 in the radial direction 61 and at least one opening 63 in the axial direction 62. The opening 63 in the axial direction 62 points to the connection 36 that leads to the ambient air 16. The valve body 33 has a central region 66, which extends in a cylindrical shape in the axial direction 62, around the receptacle 38 for the motor shaft. The valve body also has a cover disk 37 which, starting from the upper end of the central region 66, extends in the radial direction 61. At the radial outer edge or near the outer edge of the cover disk 37, the valve body has a wall region 68 which extends in the axial direction or at a right angle from the cover disk and substantially parallel to the central region 66. Between the wall region 68 and the central region 66 there extends a channel 69 which conducts gas and extends at least between the openings 65, 64 and/or also communicates with the opening 63. The channel 69 thus has, for example, three openings 63, 64, 65 which point in the axial 62 and/or radial 61 direction. The cover disk 37 is not continuous and leaves at least one opening 63 free, which extends in the axial direction 62.

The wall region 68 is not continuous and leaves at least two openings 65, 64 free, which extend in the radial direction 61. The at least one opening 65, 64 in the radial direction 61 can also be designed as a bore through the valve body. There are then two openings 65, 64 which are connected to each other by a channel 69. Within the meaning of the invention, an opening can also be a wide-lumen region which permits a considerable gas flow. The wall region can assume any shape that is suitable for substantially preventing a gas flow. The wall region can therefore occupy an area that is smaller than the area of the opening.

The shape of the opening 63 and/or the shape of the connection 36 is chosen for example such that, upon rotation of the valve, the overlap between the opening 63 and the connection 36 increases or decreases linearly, depending on the direction of rotation. Upon rotation of the valve, the overlap between the opening and the connection 36 can also increase non-linearly, for example quadratically or logarithmically or discontinuously.

The shape of the opening 63 and/or the shape of the connection 36 is, for example, at least partially oval, rounded or triangular.

The oscillation valve permits an oscillation on the pressure signal by reducing the pressure via an opening 63 to the environment. The opening to the environment can additionally be used to relieve the patient. The opening to the environment can furthermore support or facilitate the patient's breathing in the pause switch position.

Valve settings other than those shown here can also be provided for the oscillation during insufflation and/or exsufflation.

Figure 12:
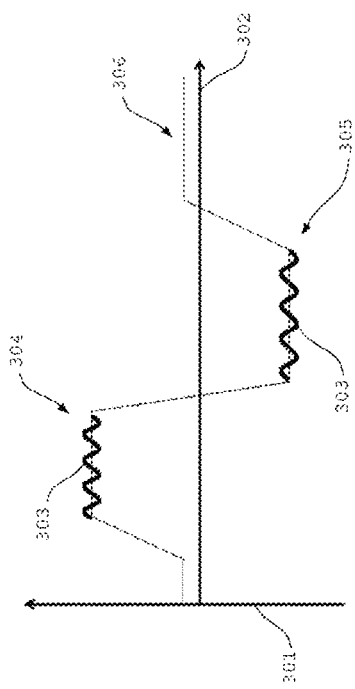
FIG. 12 shows an example of a pressure curve when the ventilator according to the invention is used.

FIG. 12 shows an example of a pressure curve as can be provided when the ventilator 1 is used. For this purpose, the pressure 301 was plotted against the time 302.

During the insufflation 304, a correspondingly high pressure 301 is present for a defined time. For particularly effective stimulation of the cough stimulus or for particularly effective release of secretion, there is then a very brief switch to exsufflation 305. For this purpose, the pressure 301 is lowered to a correspondingly negative level within a defined time span and maintained for a defined duration. According to the invention, the switchover is effected in particular also by the switching valve 2 and the blower.

Then, for example, the pressure can be increased again to the desired level for the insufflation. According to the invention, the switchover is also effected here, in particular, by the switching valve 2 and the blower. The pressure 301 is then lowered again very quickly for the exsufflation. This change between insufflation and exsufflation can be repeated for a desired period of time. For example, the number of repetitions and/or the frequency of the repetitions can be predefined by a user or care provider.

In the curve shown here, a pause 306 is provided after the exsufflation 305. This affords the patient great relief, since the coughing processes require considerable physical exertion. The pressure curve shown here has a slight overpressure or a positive therapy pressure during the pause 306. Exhaling against a slight, targeted overpressure is particularly useful in terms of respiratory therapy. The overpressure can for example be set up as a constant positive pressure (CPAP).

For example, the pressure is between 4 and 30 mbar. By contrast, a pressure in the range of approximately +/−70 mbar or even higher can be set for exsufflation and/or insufflation. During the pause, there are typically considerably smaller flows during inhalation and exhalation compared to insufflation or exsufflation.

Ventilation can also be provided during the break. For example, a pressure of up to about 50 mbar and in particular between 10-35 mbar is then provided for ventilation or inspiration.

The drop in pressure 301 at the transition from insufflation to exsufflation preferably occurs here through a correspondingly rapid switchover of the valve unit. The speed of the blower for exsufflation is preferably already adjusted accordingly before the valve unit is switched. According to the invention, however, this is not necessary.

The increase in pressure 301 from the exsufflation to the next insufflation, or after a pause to the next insufflation, is preferably less rapid or takes place over a longer period of time. In addition to the changing of the valve position, the pressure increase can be achieved by carefully starting up the blower.

The pressure 301 in preparation for the pause 306 is also increased here by a correspondingly slow increase in speed of the blower.

According to the invention, a defined oscillation can take place at the level of the inspiration 304 or that of the expiration 305 or in the switchover phase between inspiration 304 and expiration 305 or during the pause 306. The oscillation valve 3 acts in such a way that, by gradual opening and closing of this valve, the flow resistance in the gas line between the gas source and the patient can be varied such that oscillations of flow and/or pressure are caused.

Figure 13:
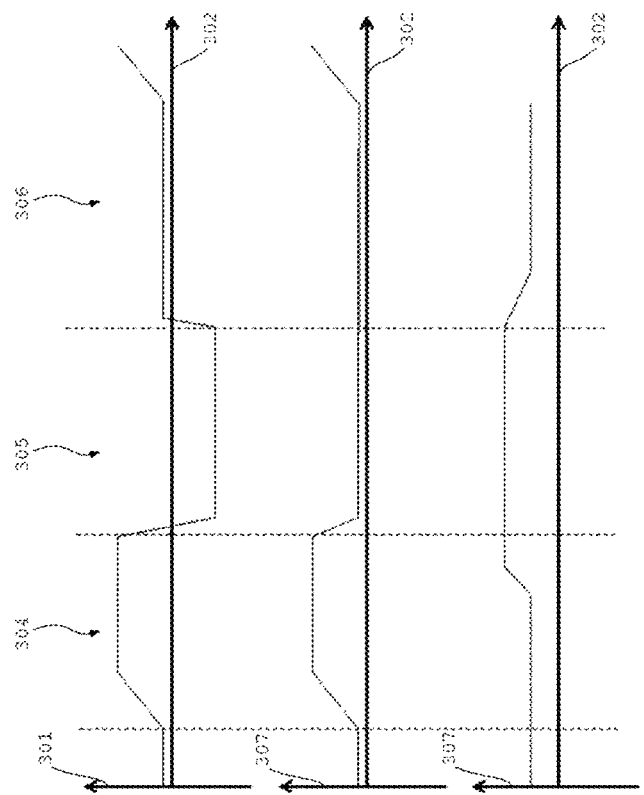
FIG. 13 shows an example of a coughing maneuver with a subsequent pause, the pressure being plotted against the time in the upper graph, a speed of the blower being plotted against the time in the middle graph and another speed of the blower being plotted against the time in the lower graph.

FIG. 13 shows an example of a coughing maneuver with a subsequent pause 306. For this purpose, the pressure 301 was plotted against the time 302 in the upper graph. In the middle graph, a speed 307 of the blower was plotted against the time 302 by way of example and in a highly idealized manner. In the lower graph, a speed 307 of the blower was plotted against the time 302 by way of example and in a highly idealized manner. The dashed lines running vertically indicate in a highly schematic manner a switchover of the valve position. At the beginning of the maneuver, the valve unit is brought into the valve position for insufflation.

The speed 307 of the blower is then slowly increased over a defined time. The pressure 301 increases accordingly. After the pressure 301 required for the insufflation is reached, the speed 307 is maintained.

After a defined time, the change from insufflation 304 to exsufflation 305 takes place. For effective triggering of the cough stimulus or particularly effective support of the discharge of secretions, the change takes place particularly briefly here. To do this, the valve unit is switched to the second valve position. The pressure 301 drops accordingly over a very short period of time. The negative pressure required for the exsufflation 305 is reached.

To be able to allow the pressure transition at particularly short notice, the speed 307 was already increased to the required level before switching on. The pressure 301 or the speed for the exsufflation 305 are now maintained for a predetermined time.

The valve unit is then switched over again. After switching on, the speed 307 is increased to such an extent that there is a correspondingly slight overpressure suitable for ventilation during the pause 306. The blower thus accelerates during the pressure build-up or to generate the pressure curve.

After the end of the pause 306, the speed can be increased again in order to reach the pressure 301 required for the insufflation 304. The cough maneuver can now begin afresh.

Overall, the invention presented here affords the advantage of making available a particularly patient-friendly and at the same time effective coughing machine. In addition, the invention affords the advantage that considerably improved ventilation is also possible. For example, during ventilation, particularly gentle support in the discharge of secretions can take place, with the patient being supported in an exhalation phase with a negative therapy pressure. The invention can be used particularly advantageously with a two-hose system.

A further advantage is that the ventilation can be carried out alone or in combination with cough or secretion therapy. For example, during cough or secretion therapy, there is a pause during which a positive therapy pressure is used in order to relieve the patient. Ventilation of the patient can also take place in the pause.

What is claimed is:

1. A ventilator, wherein the ventilator comprises a gas source, at least one gas line, a patient line, at least two valves, one of which being a switching valve and another one being an oscillation valve and each of the valves having at least indirectly a connection to ambient air and being arranged in the gas line or as part of the gas line, and at least one control unit configured to control a blower and/or the switching valve and/or the oscillation valve, wherein the switching valve has a switching action which is such that insufflation of a patient is provided in a first switching position and exsufflation of the patient is provided in a second switching position, wherein the oscillation valve acts in such a way that a flow resistance in the gas line between blower and patient can be varied by a stepwise opening and closing of the oscillation valve, as a result of which oscillations of flow and pressure are brought about during insufflation and/or exsufflation, and wherein the oscillation valve comprises an electrically driven motor with a stator and a valve body fastened for conjoint rotation to a rotor, the valve body being rotatably mounted about an axis of rotation, and a radial and an axial direction of the valve body being defined on the basis of the axis of rotation, the valve body having at least one opening in the radial direction which leads to the patient line and at least one opening in the axial direction which leads to the ambient air.

2. The ventilator of claim 1, wherein the at least two valves are at least temporarily connected to the gas source and the patient line or the ambient air in a gas-conducting manner.

3. The ventilator of claim 1, wherein the at least two valves are fluidically connected in series in at least one switching position and in at least one part of the gas line.

4. The ventilator of claim 1, wherein the switching valve comprises an electrically driven motor with a stator and a valve body fastened for conjoint rotation to a rotor, the valve body being rotatably mounted about an axis of rotation, and a radial and an axial direction of the valve body being defined on the basis of the axis of rotation.

5. The ventilator of claim 1, wherein the valve body of the oscillation valve is designed such that, depending on a position of the oscillation valve, the oscillation valve at least partially closes or opens the at least one opening that leads to the patient line, or the at least one opening that leads to the ambient air, for a respiratory gas flow.

6. The ventilator of claim 1, wherein the valve body of the oscillation valve has a region which represents a receptacle for a motor shaft and also has a wall region which, in a rotary position of the valve, at least partially closes or opens the at least one opening that leads to the patient line, or the at least one opening that leads to the ambient air, for a respiratory gas flow, and, depending on a rotary position of the oscillation valve, at least one of the opening to the patient line and the opening to the ambient air of the oscillation valve thus releases a respiratory gas flow in a direction of the patient line or a gas flow in a direction of an environment.

7. The ventilator of claim 1, wherein the valve body of the oscillation valve has a central region which extends in a cylindrical shape in the axial direction around a receptacle for a shaft of the motor, and also comprises a cover disk, which extends from an upper end of the central region in the radial direction, and, on a radial outer edge or near an outer edge of the cover disk, a wall region which extends in the axial direction or at a right angle starting from the cover disk and extends substantially parallel to the central region, a channel that conducts gas extending between the wall region and the central region, and the opening to the patient line and the opening to the ambient air of the valve body being connected via the channel in a gas-conducting manner.

8. The ventilator of claim 7, wherein the cover disk has the opening to the ambient air which, in a rotary position of the valve, is connected to a connection to an environment in a gas-conducting manner.

9. The ventilator of claim 8, wherein a shape of the opening to the ambient air and/or a shape of the connection to the environment are designed such that an overlap between the opening and the connection, upon rotation of the valve, increases or decreases linearly depending on a direction of rotation.

* * * * *